US009927154B2

(12) United States Patent
King

(10) Patent No.: US 9,927,154 B2

(45) Date of Patent: Mar. 27, 2018

(54) CRYOGENIC COOLING APPARATUS AND SYSTEM

(71) Applicant: Oxford Instruments Nanotechnology Tools Limited, Abingdon Oxon (GB)

(72) Inventor: Chris King, Oxfordshire (GB)

(73) Assignee: OXFORD INSTRUMENTS NANOTECHNOLOGY TOOLS LIMITED (GB)

( * ) Notice: Subject to any disclaimer, the term of this patent is extended or adjusted under 35 U.S.C. 154(b) by 412 days.

(21) Appl. No.: 14/554,454

(22) Filed: Nov. 26, 2014

(65) Prior Publication Data

US 2015/0345837 A1 Dec. 3, 2015

(30) Foreign Application Priority Data

Nov. 29, 2013 (GB) .................................. 1321088.5

(51) Int. Cl.

*F25B 9/00* (2006.01)
*F25B 21/00* (2006.01)
(Continued)

(52) U.S. Cl.

CPC .............. *F25B 21/00* (2013.01); *F17C 3/085* (2013.01); *F25B 9/145* (2013.01); *F25D 3/10* (2013.01);
(Continued)

(58) Field of Classification Search

CPC ............ F25B 2321/00; F25B 2321/002; F25B 2321/0021; F25B 2321/0022;
(Continued)

(56) References Cited

U.S. PATENT DOCUMENTS 4,595,899 A 6/1986 Smith et al.
5,517,168 A 5/1996 Dorri et al.
(Continued)

FOREIGN PATENT DOCUMENTS

JP 9-145195 6/1997
JP 9-217964 8/1997

*Primary Examiner* — Frantz Jules
*Assistant Examiner* — Erik Mendoza-Wilkenfel
(74) *Attorney, Agent, or Firm* — Blank Rome LLP

(57) ABSTRACT

Cryogenic cooling apparatus is disclosed for cooling a target region using the demagnetization cooling effect. The apparatus has a primary magnet for providing a magnetic field within the target region and a demagnetization magnet arranged to selectively provide conductive cooling to the target region. A primary shielding magnet substantially cancels the magnetic field from the primary magnet at least at a first position between the primary and demagnetization magnets. A demagnetization shielding magnet substantially cancels the magnetic field from the demagnetization magnet at least at the first position between the primary and demagnetization magnets. Each of the primary shielding magnet and demagnetization shielding magnet comprises a cylindrical superconducting coil having a geometric envelope which encloses the primary magnet and demagnetization magnet respectively. A conductive cooling assembly provides conductive cooling to each of the magnets. A cryogenic system including a cryostat, the apparatus and a refrigeration system is also provided.

15 Claims, 2 Drawing Sheets

(51) Int. Cl.

| | |
|---|---|
| ***H01F 1/00*** | (2006.01) |
| ***F25D 3/10*** | (2006.01) |
| ***F17C 3/08*** | (2006.01) |
| ***F25B 9/14*** | (2006.01) |
| ***F25D 19/00*** | (2006.01) |
| *H01F 6/00* | (2006.01) |

(52) U.S. Cl.
CPC ...... *F25D 19/006* (2013.01); *F25B 2321/002* (2013.01); *F25B 2321/0021* (2013.01); *H01F 6/00* (2013.01); *Y02B 30/66* (2013.01)

(58) Field of Classification Search
CPC .... F25B 2321/0023; F25B 9/00; F25B 21/00; H01F 1/012; H01F 1/015; H01F 1/017
See application file for complete search history.

(56) References Cited

U.S. PATENT DOCUMENTS

| | | | | |
|---|---|---|---|---|
| 5,883,558 | A | 3/1999 | Laskaris et al. | |
| 2006/0181381 | A1* | 8/2006 | Markiewicz | G01R 33/3875 335/216 |
| 2013/0237426 | A1* | 9/2013 | Tamura | H01F 6/04 505/163 |
| 2013/0305742 | A1* | 11/2013 | Wu | F25B 9/145 62/3.1 |
| 2014/0007596 | A1* | 1/2014 | Prester | F25B 9/145 62/51.1 |

* cited by examiner

CRYOGENIC COOLING APPARATUS AND SYSTEM

FIELD OF THE INVENTION

The present invention relates to a cryogenic cooling apparatus which uses the entropic effect of demagnetisation to provide the cooling of a target region. The invention also relates to a refrigeration system including such cryogenic cooling apparatus.

BACKGROUND TO THE INVENTION

There is significant interest, both in scientific research and in certain commercial sectors, in being able to provide ultra-low temperature environments. Such environments can be thought of as having a temperature of 1 milliKelvin or less. This temperature range is beyond the reach of conventional dilution refrigerators. It is however possible to achieve such temperatures by using the effect of "nuclear demagnetisation". Essentially, using this technique, a cooled member is located within a relatively strong magnetic field so as to align the nuclear spins, whilst at the same time also being cooled to a temperature of a few milliKelvin using a dilution refrigerator for example. The material is then thermally decoupled from the dilution refrigerator and the material is allowed to demagnetise. The increased misalignment of the nuclear spins causes an increase in entropy of the material which in turn lowers its temperature further. By placing such a material undergoing demagnetisation in close thermal contact with a sample allows that sample to attain a similar temperature to the material itself. With the use of this nuclear demagnetisation technique temperatures of tens of microKelvin are achievable.

In many circumstances it is desirable for a sample to be held within a magnetic field (for example for performing NMR analysis) whilst being cooled to ultra-low temperatures. This requires the provision of two magnets, a first experimental magnet within the bore of which the sample is positioned, together with a second demagnetisation magnet located nearby and positioned so as to be available to provide the cooling power necessary for the sample to be cooled to the desired ultra-low temperature. Each of the experimental and demagnetisation magnets is formed from a superconducting material which is maintained at a temperature of around 4 Kelvin using liquid helium. This is advantageous since it ensures that only a relatively small temperature difference exists between the magnet coils themselves and either of, the sample to be cooled, or the material which is to undergo nuclear demagnetisation.

Since such systems include two relatively powerful magnets in close proximity to one another, one of which must be able to undergo a full magnetic ramp up or ramp down whilst the other remains at operational field, it is critical to their design that these magnets do not unduly influence each other. For this reason, each magnet is typically provided with an associated shielding magnet (such as a coil arrangement). The role of the shielding magnet in each case is primarily to prevent the magnetic field of one magnet influencing the other magnet. Thus, the shielding magnets in each case are designed to provide a cancelled or near zero-field region positioned between the experimental and demagnetisation magnets. Due to the relative changes in magnetic field between each magnet and it's associated shielding magnet being simultaneous, it follows that it is also necessary to ensure that each shielding magnet provides this cancelled field for its respective magnet, rather than the shielding magnets working together to produce a zero-field only by superposition. Known shielding magnets for such systems typically have a number of features, these being as follows:

a) The magnet coils have a narrow dimension in the axial direction of their cross section which may even be less than the radial extent of their cross section (this cross section relating to the coil windings on a single side of the coil axis);

b) Multiple, spatially dispersed coils are typically provided for each shielding magnet;

c) The coils are typically positioned at an axial location between that of the magnet they are shielding and the cancellation region; and, d) The coils are provided and immersed in the same liquid cryogen reservoir of the magnet which they are shielding.

In summary therefore, the shielding coils of known demagnetisation systems have a very specific and well developed design driven by the somewhat unique nature of demagnetisation systems. It is in this context that the present invention has been devised.

SUMMARY OF THE INVENTION

In accordance with the first aspect of the present invention we provide a cryogenic cooling apparatus for providing cooling to a target region using the demagnetisation cooling effect, the apparatus comprising: a primary magnet for providing a magnetic field within the target region; a demagnetisation magnet arranged to selectively provide conductive cooling to the target region; a primary shielding magnet for substantially cancelling the magnetic field from the primary magnet at least at a first position between the primary and demagnetisation magnets, the primary shielding magnet comprising a cylindrical superconducting coil having a geometric envelope which encloses the primary magnet; a demagnetisation shielding magnet for substantially cancelling the magnetic field from the demagnetisation magnet at least at the first position between the primary and demagnetisation magnets, the demagnetisation shielding magnet comprising a cylindrical superconducting coil having a geometric envelope which encloses the demagnetisation magnet; and, a conductive cooling assembly for coupling in use to a refrigeration system, the conductive cooling assembly being arranged to provide conductive cooling to each of the said magnets.

The use of conductive cooling of the primary (experimental) and demagnetisation magnets, together with each of their respective shielding magnets, represents a radical departure from known practices. The conductively cooled shielding magnets of the present invention have an entirely different design when compared with known demagnetisation systems. In particular, these now take a cylindrical form whereby the geometrical envelope of the shielding magnet coil encloses the magnet which is shielded. Thus the geometry of the shielding magnet may be thought as a right circular cylinder with open ends and the respective magnet which it shields is preferably positioned centrally within the cylinder and has an axial dimension which is less than that of the shielding magnet. This geometry is in complete contrast with previous demagnetisation system magnetic shields. Furthermore, it will be noted that typically only a single coil shielding magnet is provided rather than the use of multiple coils. The geometric centre of the coil of the shielding magnet therefore typically coincides with that of the respective magnet which it shields. This new design therefore largely removes the need for mechanical force constraint of the shielding coils which was required in prior systems to withstand axial forces of the order of thousands of Newtons due to the multiplicity and off-centre positions of the shielding coils.

The removal of the use of liquid cryogens also removes the constraint on the radius of the shielding coils, although an increased radius does increase the amount of physical material present and therefore places additional requirements on the cooling system.

It is preferred that one or each of:

a. the primary magnet and primary shielding magnet are each arranged as superconducting magnets which are powered by a first common superconducting current; or b. the demagnetisation magnet and demagnetisation shielding magnet are each arranged as superconducting magnets which are powered by a second common superconducting current.

The use of a common current to power not only the magnet but also its shield ensures proportionate shielding is provided at all times during the operation of the magnet including ramping up and ramping down as well as during it's full energisation stage.

Typically however, the first and second common superconducting currents are respectively independent and this allows the full independent operation of the demagnetisation magnet in comparison with the primary magnet and vice versa. In each case, the primary shielding magnet and the demagnetisation shielding magnets are each formed from single cylindrical solenoid coils. Thus, only one shielding coil is provided per magnet which aids its use with a conductive cooling system. It will be understood however that this design would be significantly disadvantageous for use in a liquid cryogen cooled system since the surface area of such a cylindrical coil is extensive and its position relative to the magnet which it shields in each case would require significant additional volumes of cryogenic liquid.

As will be understood, the specific design of the shielding coil of the shielding magnet in each case is dependent upon the geometry of the magnetic shield as well as any other dimensional requirements of the specific system in question. Preferably however, one or each of the primary shielding magnet and the demagnetisation shielding magnet have an axial length which is greater than the dimension of the respective magnet that they shield by between 10 and 40%. The minimum diameter of the shielding magnet coil in each case will of course be greater than the maximum diameter of the coils of the magnet which it shields. Thus the containment of either the primary or demagnetisation magnet within its respective shielding magnet is assured by the larger axial and radial dimensions of the shielding magnet.

Typically, the primary magnet and the demagnetisation magnet are each formed from coils having rotational symmetry about an axis 95 in each case. The axis 95 is preferably common to each of the primary and demagnetisation magnets such that the magnets are arranged axially. Thus the first position at which substantially zero field is produced as a result of the combination of the respective magnets and their shields, is preferably positioned along this axis 95, typically being intersected by the axis 95. Such a location is a convenient position for the positioning of any required apparatus which may be subject to malfunction as a result of magnetic fields. For example it is advantageous to provide a heat switch located at the first position between the primary and demagnetisation magnets, the heat switch being arranged to provide the target region with conductive cooling in a selective manner from a demagnetisation member which is selectively magnetised by the demagnetisation magnet.

Due to the requirement to provide ultra-low temperatures it will be understood that the demagnetisation member, which has its nuclear magnetic spins aligned by the demagnetisation magnets, together with the target region, may be isolated from the irradiative heating of the surrounding magnet coils by the provision of one or more intervening radiation shields cooled to an intermediate temperature (for example by using a dilution refrigerator).

Since the respective magnets are conductively cooled, there is no need for the provision of liquid cryogen to provide the cooling effect. Typically one or more vacuum chambers are provided within which the primary, primary shielding, demagnetisation and demagnetisation shielding magnets are contained, such that, when in use, the said magnets are each located within a vacuum environment. This environment is therefore absent any liquid cryogen. It is also contemplated that a flow cooling approach could be adopted to cool the magnets in which a cryogen such as gaseous helium is flowed through ducts in thermal communication with the magnet windings. This approach may be particularly beneficial for use with magnets formed from high temperature superconductors.

The conductive cooling assembly preferably comprises one or more thermally conductive members for coupling with the refrigeration system. The refrigeration system in question typically comprises a mechanical refrigerator ("cryocooler"). Such a mechanical refrigerator is typically a pulse tube refrigerator (PTR), Gifford-McMahon (GM) refrigerator or similar. For example in the case of a PTR, the second stage of a two-stage PTR is used to cool the magnets by the conductive cooling assembly whereas the first stage may be used to cool radiation shields having an intermediate temperature such as between 20 and 50 Kelvin. The second stage of the mechanical refrigerator may also be used to cool a dilution refrigerator. In a similar manner to known systems, the dilution refrigerator may therefore provide the low temperature cooling required in order to cool the sample region and demagnetisation member to the temperature of a few milliKelvin required prior to cooling by the demagnetisation effect.

As will be understood, a metallic material such as high purity copper may be used to provide the thermally conductive members of the conductive cooling assembly, these members coupling with the refrigeration system. Likewise, high purity copper may also be used to thermally connect the demagnetisation material and a sample stage of the target region. A particularly beneficial class of material for use as the demagnetisation material is those based on $PrNi_5$ which exhibit excellent demagnetisation cooling performance. Such materials may also be used as the thermally conductive members.

In accordance with the second aspect of the present invention we provide a cryogenic system comprising:

a. a cryostat;

b. cryogenic apparatus according to the first aspect of the invention, contained within the cryostat; and, c. a refrigeration system coupled to the conductive cooling assembly of the cryogenic apparatus.

The use of conductive cooling in association with the cylindrical shielding magnet design allows for a more compact arrangement of the magnets in comparison with known systems, due to the axial extent of the shielding magnet coils in particular being less distant from the magnet centre. This in turn allows the use of a cryostat having a reduced axial length. Any cryocooler, dilution refrigerator or equivalent apparatus providing the refrigeration may be arranged on axes which are orthogonal to the axis defining the magnets so as to provide for a more compact geometrical arrangement.

BRIEF DESCRIPTION OF THE DRAWINGS

An example of a cryogenic cooling apparatus and system is now described with reference to the accompanying drawings, in which.

DESCRIPTION OF PREFERRED EXAMPLES

Figure 1:
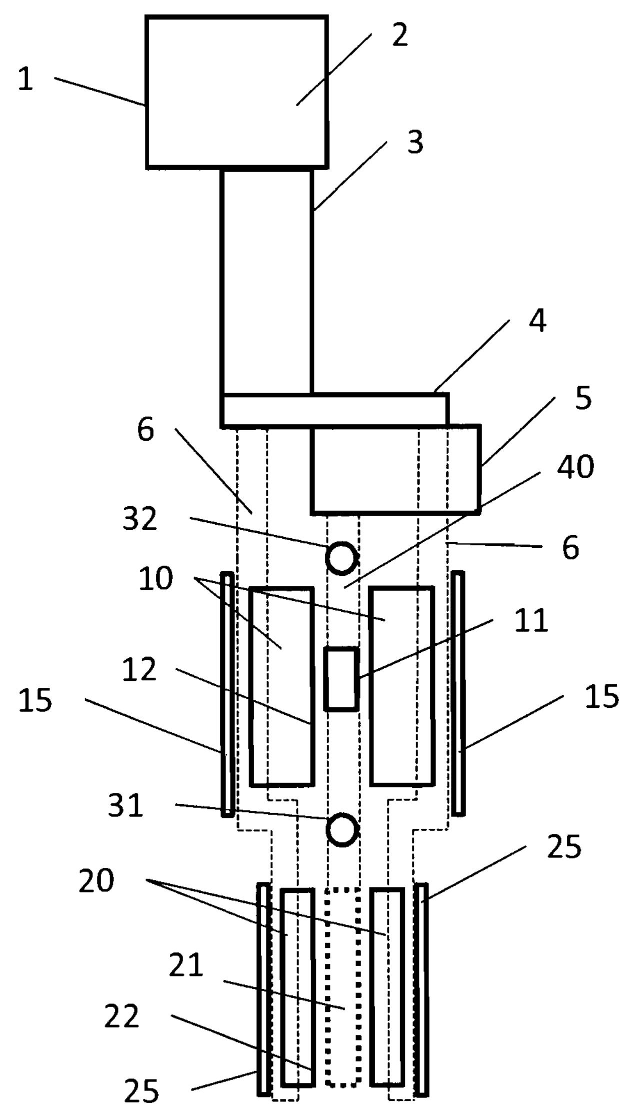
FIG. 1 is a schematic illustration of an example system.

FIG. 1 shows an example demagnetisation cooling system generally illustrated at 100. The cooling power to the system is provided by a pulse tube refrigerator (PTR) 1 which in the present case is a two stage device. This has a cooling head 2 from which extend pulse and regenerator tubes generally illustrated at 3. Although this is a two stage device, only the second, lower temperature stage 4 is illustrated for simplicity. The tubes 3 and second stage 4, together with the further apparatus to be described below, are all contained in a vacuum cryostat which is not illustrated in FIG. 1 for clarity purposes. Particularly the PTR 1 is capable of providing a cooling power of around 1 Watt at a temperature of 4.2 Kelvin at the second stage 4. This cooling power is used within the present system in two ways. Firstly, the second stage 4 is used to provide cooling power for a dilution refrigerator shown schematically at 5. Secondly, the cooling power of the second stage 4 is used to cool a conductive cooling assembly 6 which is formed from an arrangement of high thermal conductivity materials, such as copper and aluminium. As will be described, the conductive cooling assembly 6 provides cooling power to the super conducting electromagnets used within the system, maintaining them at a temperature of around 3-5 Kelvin when in use.

A primary magnet in the form of an experimental magnet is shown at 10 in FIG. 1. The experimental magnet is used to provide a highly homogeneous magnetic field within a target region 11 located within a centre bore 12 of the experimental magnets 10. When in use, the sample region 11 is provided with a sample for monitoring, for example using NMR techniques. It is desirable in the case of NMR and indeed other techniques, to provide a strong magnetic field within the target region. Thus the experimental magnet 10 may be arranged to provide a magnetic field within the target region 11 in excess of 10 Tesla. A magnetic field strength of such a high magnitude naturally produces a high magnetic field strength at positions external to the magnet geometrical envelope itself. Thus, higher magnetic fields may be experienced at positions axially displaced from the magnet 10 (in a vertical direction with respect to the orientation of FIG. 1), as well as in a radial direction external to the magnet envelope (in a horizontal direction with respect to FIG. 1). Such stray fields are generally disadvantageous. In the case of a demagnetisation cooling system such as the system 100, in fact it is critical to the operation of the apparatus that a "zero-field" region may be established at an axial position with respect to the experimental magnet 10.

In order to achieve a zero-field region, the experimental magnet 10 is provided with a complementary shielding magnet 15. The shielding magnet 15 is provided as an elongate solenoid coil having a geometry in the form of a right circular cylinder and a length in excess of that of the experimental magnet 10. The shielding magnet 15 is energised in use using the same current as the experimental magnet 10, although this magnet is "reverse energised" with respect to the experimental magnet 10 such that, at positions where the magnetic fields from each of the magnets 10 and 15 are experienced, the magnetic field vectors are generally opposed and the superposition of the respective magnetic fields causes a reduction in the resultant field strength. The provision of the shielding magnet 15 dramatically reduces the magnetic field strength provided by the experimental magnet 10 at locations axially and radially distal from the geometric envelope of the experimental magnet 10. The respective designs of the experimental magnet 10 and shielding magnet 15 are such that an effective zero-field position may be established axially with respect to the experimental magnet 10. This is discussed further in association with FIG. 2.

It will be understood by those of ordinary skill in the art that the experimental magnet 10 may in practice be formed from more than one coil of superconducting wire. Unlike in the prior art however, the shielding magnet 15 comprises a single solenoid coil which has an overall diameter in excess of that of the experimental magnet 10 and an axial length in excess of the experimental magnet 10 also. It will be noted that the experimental magnet 10 is also formed from one or more solenoid coils, these defining a central axis which is coincident with a bore 12 of the experimental magnet and is also coincident with the axis of the cylinder defining the shielding magnet 15.

At a position which is coaxial with, and axially spaced from, the experimental magnet 10 and shielding magnet 15, a demagnetisation magnet 20 is located. We note here that the demagnetisation magnet 20 may be arranged physically above or below the experimental magnet 10. Two such magnets 20 could also be provided (such as above and below) so as to allow greater cooling power, cooling to lower temperatures or continuous use (by employing anti-phase cycles of magnetisation and demagnetisation between the two demagnetisation magnets). In a similar manner to the experimental magnet 10, the demagnetisation magnet 20 is a cylindrical magnet arranged so as to have a bore 22. Within this bore 22 is located a large demagnetisation member 21. The design of the demagnetisation magnet 20 is rather different from that of the experimental magnet 10 in that it is designed to provide a low homogeneity magnetic field in a region which is significantly larger (for example 20 $cm^3$) than the region 11 (around 1 $cm^3$). The magnetic field homogeneity of the experimental magnet can be designed at very high levels of homogeneity using this arrangement. This is typically between 100 ppm down to 1 ppm in a 1 cm diameter sphere. In comparison with known shielding magnets for such demagnetisation systems, the shielding magnet 15 allows the magnetic field homogeneity within the experimental magnet to be sufficiently high to enable NMR experiments to be performed.

Since the demagnetisation of the demagnetisation member 21 provides the cooling power to cool the sample within the target region 11 to an ultra-low temperature, the volume of the demagnetisation member 21 is one of the factors controlling the cooling power provided. Therefore a larger demagnetisation member can provide a greater cooling effect. In the present case, the demagnetisation magnet 20 provides a smaller magnetic field strength within its bore 22 when compared with that of the experimental magnet 10. For example, a magnetic field strength of between 5 and 10

Tesla may be experienced within the bore 22 by the demagnetisation member 21. Nevertheless, similar issues arise regarding controlling the stray field from the demagnetisation magnet 20. For this reason, this magnet is also provided with a complementary demagnetisation shielding magnet 25. In a similar manner to its experimental magnet counterpart 15, the demagnetisation shielding magnet 25 is again formed from a single cylindrical solenoid coil, this having an axial dimension in excess of the axial dimension of the demagnetisation magnet 20 itself. Again, the minimum diameter of the demagnetisation shielding magnet 25 is greater than the maximum diameter of the demagnetisation magnet 20. Thus, due to its larger axial and radial dimension, the demagnetisation shielding magnet 25 is arranged to confine the demagnetisation magnet 20 within its geometric envelope. Similar benefits in terms of the reduction of stray field in each of the axial and radial directions apply in this case also.

Referring again to FIG. 1, two regions 31 and 32 are illustrated respectively at on-axis positions within FIG. 1. The first position 31 is located between the experimental magnet 10 and demagnetisation magnet 20. This represents a location of magnetic field cancellation such that substantially zero-field is experienced at this location. In fact this represents the superposition of field cancellation between the experimental magnet 10 and the shielding magnet 15, and also between the demagnetisation magnet 20 and the demagnetisation shielding magnet 25. Each pair of magnets provides a zero-field region and these are superposed. As a result of this, there is effectively no resultant magnetic force experienced between the magnets 10 or 15 on the one hand, and magnets 20 or 25 on the other. Put another way, the experimental magnet 10 is not "seen" by the demagnetisation magnet 20, nor is the demagnetisation magnet 20 seen by the experimental magnet 10.

This is very important for the system design for three main reasons. Firstly, it means that the target region 11 can be assured to have very high homogeneity, this being not influenced by the demagnetisation magnet or its shield. Secondly, the demagnetisation magnet 20 may be operated entirely independently of the experimental magnet 10. Thirdly, it removes the need for engineering reinforcements to prevent relative movement between the magnets, this reducing the cost and, more importantly, removing potential paths of heat transfer, remembering that the operational objective of the system is to achieve temperatures in the range of tens of micro Kelvin.

Regarding the second location 32, this relates to a cancelled field position caused by the superposition of the fields from the experimental magnet 10 and shielding magnet 15 only (and not influenced by the demagnetisation magnet or its shield). This ensures that the dilution refrigerator and other apparatus are shielded from the experimental magnet 10.

In the present system, each of the regions 31, 32 are utilised by the provision of heat switches at each location.

The cooling power of the dilution refrigerator 5 is, in use, provided via a thermally conductive member 40 which is selectively coupled with each of the dilution refrigerator, sample holder within the target region 11 and also the demagnetisation member 21. However, heat switches positioned at the first position 31 and second position 32 selectively allow heat flow along the conductive member 40. Thus the heat switch at the second position 32 allows the sample in the target region and the demagnetisation member to be thermally isolated from the dilution refrigerator 5. Likewise, the heat switch in the first position 31 allows the demagnetisation member 21 to be thermally isolated from the target region 11. Through the use of these heat switches, the sample and demagnetisation member may each be cooled initially to a few milliKelvin by the dilution refrigerator. Thereafter, by operating the thermal switch at position 32 and reducing the strength of the magnetic field from the demagnetisation magnet 20, the entropy of demagnetisation causes the demagnetisation member to cool, thereby conductively cooling the sample within the target region 11. The demagnetisation member 21 may be thermally isolated from the target region 11 by the heat switch at position 31 during a magnetisation cycle of the demagnetisation magnet 20.

Referring again to the conductive cooling assembly 6, as is shown in FIG. 1, this provides high thermal conductivity material linking the cooled second stage 4 of the PTR 1 to each of the experimental magnet 10 windings, cooling magnet 15 windings, demagnetisation magnet 21 windings, and demagnetisation shielding magnet 25 windings. The form of the conducting cooling assembly is designed so as to maximise the cooling effect of the respective magnet coil windings. This prevents the developments of local "hot spots" which may cause a malfunction in the superconducting magnets.

Figure 2:
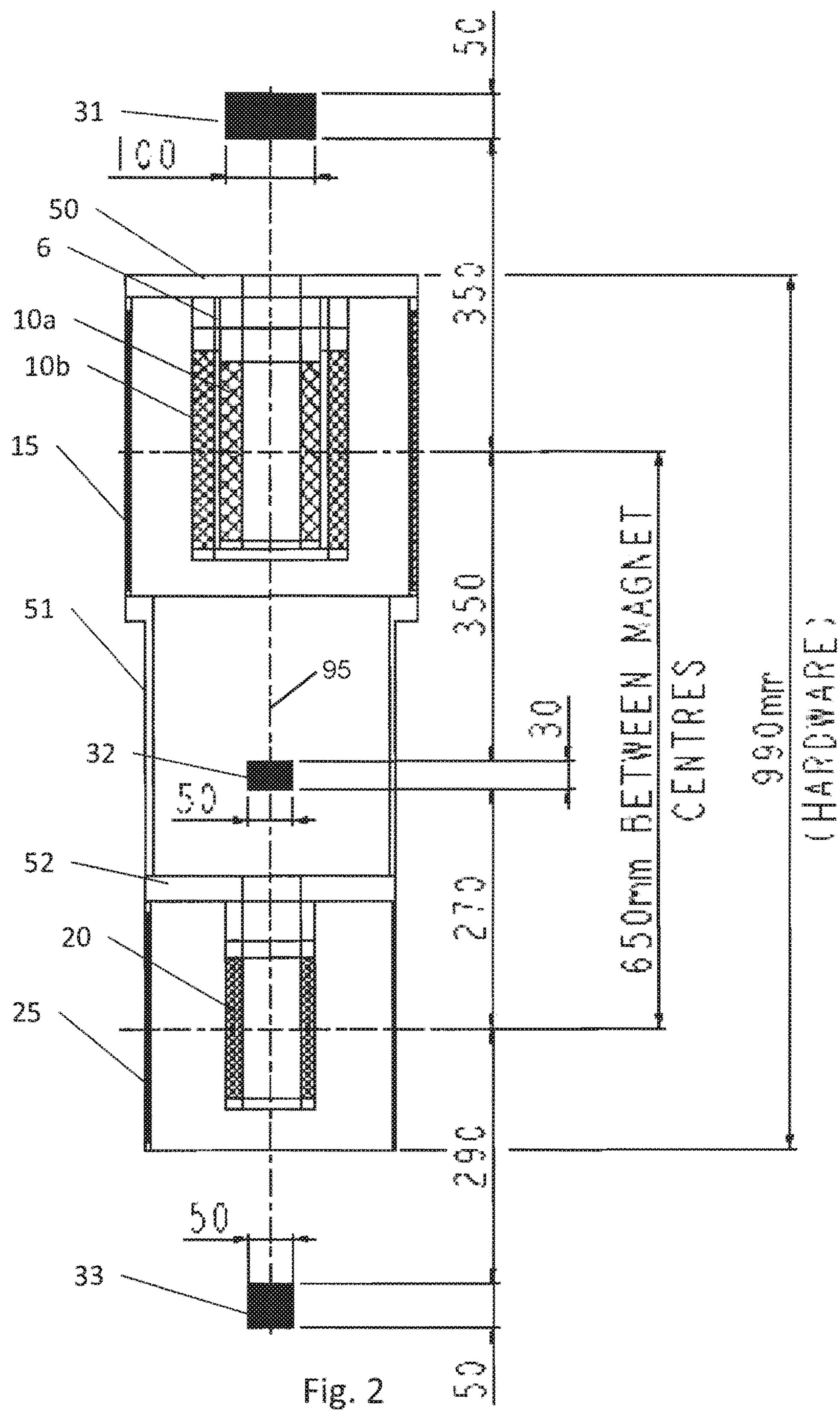
FIG. 2 shows further details of the primary and demagnetisation magnets of the system.

FIG. 2 shows an example cross section of a practical arrangement of the magnets in FIG. 1. The experimental magnet 10 is shown formed from two solenoid coils 10*a*, 10*b*, these being wound upon a former. A top plate 50 of the conductive cooling assembly 6 is used to bolt the magnet assembly as a whole to the second stage 4 of the PTR 1. The shielding magnet 15 is shown surrounding the coils 10*a*, 10*b*. The coils of the shielding magnet 15 are wound upon a former in thermal contact with the windings. Attached to a lower end of the shielding magnet 15 is a further part of the conductive cooling assembly 6 in the form of a hollow tube 51 which provides physical connection between the experimental magnet 10 and shielding magnet 15 on the one hand, and the demagnetisation magnet 20 and demagnetisation shielding magnet 25 on the other.

A second plate 52, analogous to plate 50, can be seen attached to the lower and of tube 51. The tube 51 and second plate 52 each provide a further part of the conductive cooling member 6 and are therefore formed from high conductivity material (copper in this case). The magnets 20 and 25 are illustrated in FIG. 2 in an analogous manner to their experimental magnet counterparts. The first and second locations 31,32 are also shown in FIG. 2, these being approximately 50 mm in axial height and of equal or larger dimensions in diameter. A third location is also illustrated at 33, this representing a position of magnetic field cancellation arising from the superposition of magnetic fields from magnets 20,25. In practice the positions of the pulse tube refrigerator 1 and dilution refrigerator 5 are defined by the particular experimental arrangement of the apparatus. In FIG. 2 the overall dimension defined by the magnet system is illustrated as 990 mm. As a person of ordinary skill in the art will understand this is significantly less than prior art systems having similar specification experimental and demagnetisation magnets (around 1600 mm in this case). This follows from the new design of the shielding magnets, the reduction in axial forces that result and the use of conductive cooling. It will be understood the FIG. 2 illustrates the magnet arrangement and therefore is absent details of any sample holder, demagnetisation member or conductive member connecting them.

In order to counteract any transient forces during a magnet quench, the apparatus is preferably augmented with a quench management system using magnet resistors and heaters to ensure that the experimental and demagnetisation magnets, and their associated shield coils, have close to equivalent currents at all times. The necessity of this is case dependent.

The invention claimed is:

1. Cryogenic cooling apparatus for providing cooling to a target region using the demagnetisation cooling effect, the apparatus comprising:

a primary magnet for providing a magnetic field within the target region;

a demagnetisation magnet arranged to selectively provide conductive cooling to the target region, wherein the primary magnet and the demagnetisation magnet are each formed from superconducting coils having rotational symmetry about an axis, and wherein the axis is common to each of the primary and demagnetisation magnets such that the magnets are arranged axially;

a primary shielding magnet for substantially cancelling the magnetic field from the primary magnet at least at a first position between the primary and demagnetisation magnets, wherein the first position is located along the axis, the primary shielding magnet comprising a cylindrical superconducting coil having a geometric envelope which encloses the primary magnet;

a demagnetisation shielding magnet for substantially cancelling the magnetic field from the demagnetisation magnet at least at the first position between the primary and demagnetisation magnets, the demagnetisation shielding magnet comprising a cylindrical superconducting coil having a geometric envelope which encloses the demagnetisation magnet, wherein the primary shielding magnet has an axial length which is greater than the dimension of the primary magnet by between 10 and 40%, and wherein the demagnetisation shielding magnet has an axial length which is greater than the dimension of the demagnetisation magnet by between 10 and 40%; and, a conductive cooling assembly configured to be coupled to a refrigeration system, the conductive cooling assembly being arranged to provide conductive cooling to each of the the primary magnet, the demagnetisation magnet, the primary shielding magnet, and the demagnetisation shielding magnet.

2. Cryogenic cooling apparatus according to claim 1, wherein:

a. the primary magnet and primary shielding magnet are each arranged as superconducting magnets which are powered by a first common superconducting current; and b. the demagnetisation magnet and demagnetisation shielding magnet are each arranged as superconducting magnets which are powered by a second common superconducting current.

3. Cryogenic cooling apparatus according to claim 2, wherein the first common superconducting current is independent of the second common superconducting current.

4. Cryogenic cooling apparatus according to claim 1, wherein one or each of the primary shielding magnet and the demagnetisation shielding magnet are formed respectively as a single cylindrical solenoid coil.

5. Cryogenic cooling apparatus according to claim 1, wherein the demagnetisation shielding magnet is configured to cool the target region to a temperature of 1 milliKelvin or less.

6. Cryogenic cooling apparatus according to claim 1, wherein the target region comprises a sample holder.

7. Cryogenic cooling apparatus according to claim 1, further comprising a heat switch located at the first position between the primary and demagnetisation magnets, the heat switch being arranged to provide the target region with conductive cooling in a selective manner from a demagnetisation member which is selectively magnetised by the demagnetisation magnet.

8. Cryogenic cooling apparatus according to claim 1, further comprising one or more vacuum chambers within which the primary, primary shielding, demagnetisation and demagnetisation shielding magnets are contained, such that, when in use, the magnets are each located within a vacuum environment.

9. Cryogenic cooling apparatus according to claim 8, wherein the conductive cooling assembly comprises one or more thermally conductive members for coupling with the refrigeration system.

10. A cryogenic system comprising:

a. a cryostat;

b. cryogenic apparatus according to claim 1, contained within the cryostat; and, c. the refrigeration system coupled to the conductive cooling assembly of the cryogenic apparatus.

11. A cryogenic system according to claim 10, wherein the refrigeration system comprises a mechanical refrigerator arranged to cool the conductive cooling assembly.

12. A cryogenic system according to claim 11, wherein the refrigeration system further comprises a dilution refrigerator for selectively thermally coupling to each of the target region and demagnetisation material to be selectively demagnetised by the demagnetisation magnet, the dilution refrigerator being cooled by the mechanical refrigerator when in use.

13. A cryogenic system according to claim 10, wherein the conductive cooling assembly is configured to cool each of the magnets to a temperature of 3-5 Kelvin.

14. A cryogenic system according to claim 11, wherein the conductive cooling assembly is configured to cool each of the magnets to a temperature of 3-5 Kelvin.

15. Cryogenic cooling apparatus according to claim 1, wherein the conductive cooling assembly is configured to cool each of the magnets to a temperature of 3-5 Kelvin.

* * * * *